I. C. BURGET.
Horse Rake.
No. 23,155.
2 Sheets—Sheet 1.
Patented March 8, 1859.
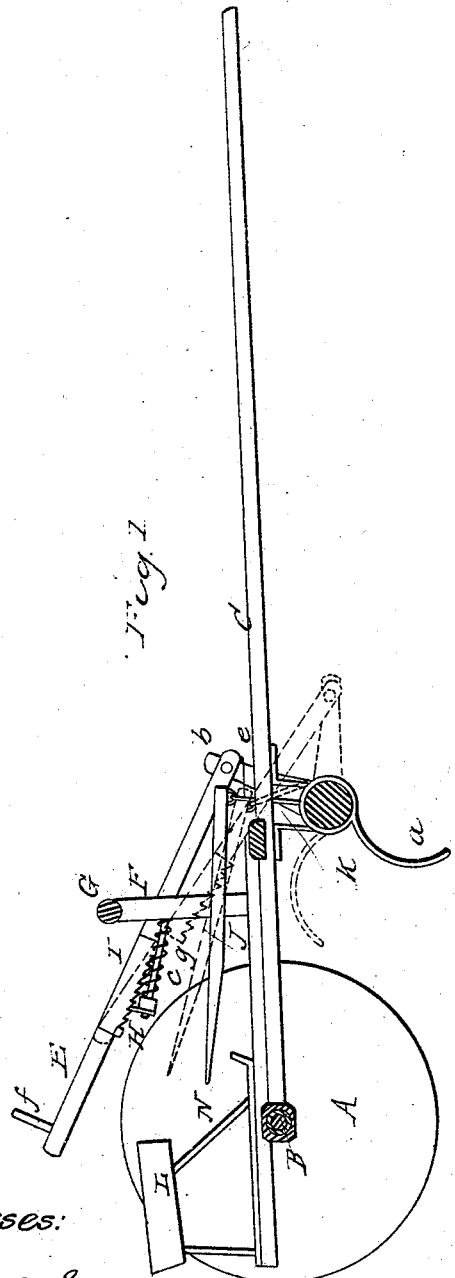
Witnesses:
James Evans
Philander Smith
Inventor:
Isaiah C. Burget

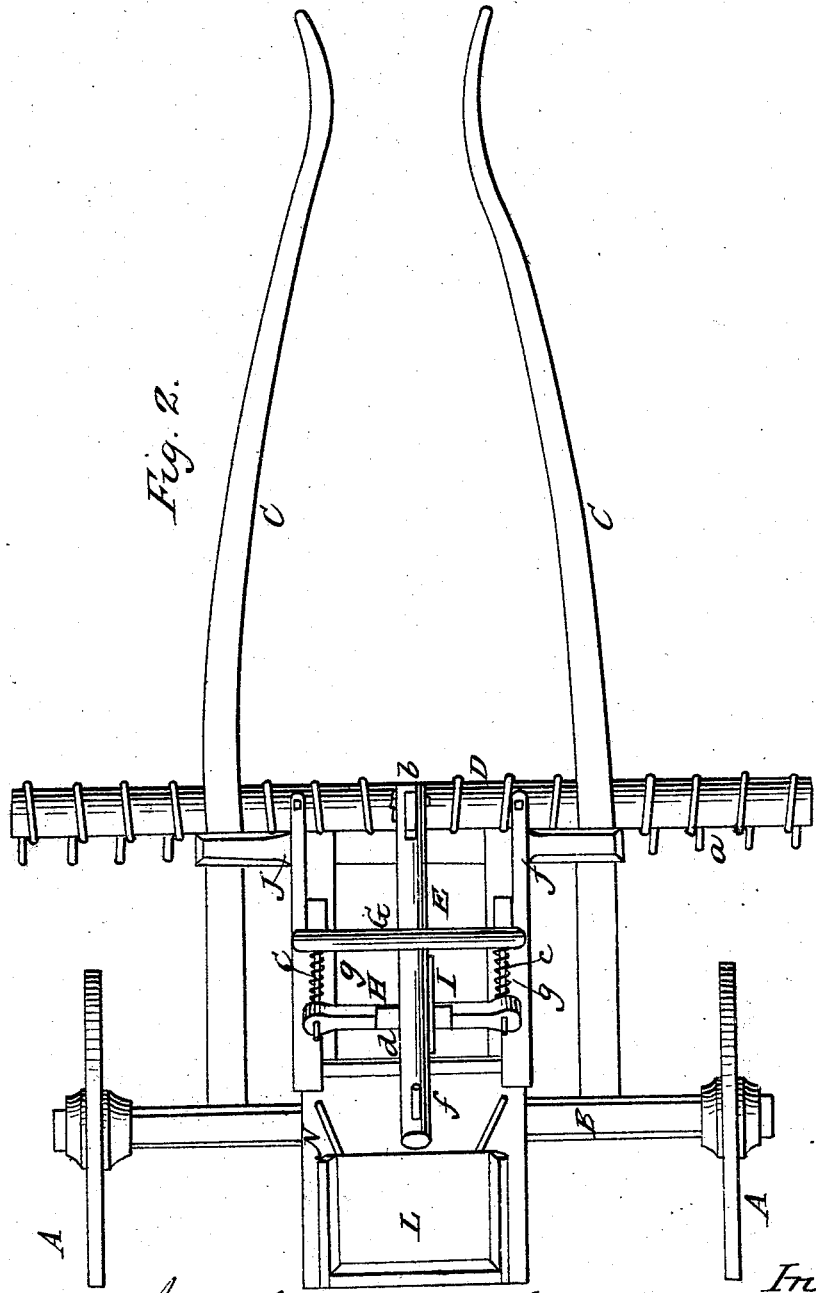

UNITED STATES PATENT OFFICE.

I. C. BURGET, OF DAVENPORT CENTRE, NEW YORK.

IMPROVEMENT IN HORSE-RAKES.

Specification forming part of Letters Patent No. 23,155, dated March 8, 1859.

*To all whom it may concern:*

Be it known that I, ISAIAH C. BURGET, of Davenport Centre, in the county of Delaware and State of New York, have invented certain new and useful Improvements in Horse-Rakes, the construction and operation of which I have described in the following specification and illustrated in its accompanying drawings with sufficient clearness to enable competent and skillful workmen in the arts to which it pertains or is most nearly allied to make and use my invention.

My said invention consists, first, in the combination and arrangement of levers by means of which one end of the rake can be conveniently raised independent of the other in order to clear any obstruction there may be upon the ground over which that end of the rake passes, as hereinafter more fully set forth; second, the combination of the sliding cross-bow springs and catch to allow the rake to yield bodily to any obstruction, as hereinafter more fully set forth.

In the accompanying drawings my invention is represented as follows: Figure 1 is a side elevation of my improved horse-rake with the near wheel removed, the red lines showing the rake as elevated. Fig. 2 is a plan.

A A are wheels placed loosely upon an axle, B, one on each end of the axle.

C C are thills attached to the axle B.

D is a rake-bar having teeth a, made of wire and wound round it, and attached thereto. In the center, and secured to the rake-bar, is an arm, b, joined to the top of which is an arm or lever, E.

F F are posts or standards mortised into the frame at the bottom, and held firmly at the top by a cross-bar, G. On the back part of the post F are projecting rods c c, one in each post, upon which the cross-bar H slides up and down on the rods. g are springs slipped over the rods c, the bottom of which rests against the post, and the top supports the sliding cross-bar H. On the cross-bar H is fastened a plate, d, the edge of which projects above the cross-bar and fits into the notches of the catch-plate I, fastened on the side of the arm or lever E. Bolted to the side of the posts F are treadles J J, one end of which is attached to the rake-bar by means of the rod e, swiveled at one end to the treadles and the other end to the rake-bar. On the top of the lever E is a handle, f.

K is a yoke attached beneath the thills, one on each side of the machine, to support the rake-bar, and in which it is vibrated.

L is a seat supported upon rods N. When the machine passes over the ground the arm or lever E is drawn over the plate d, and the notches in the plate I catch upon the plate d, which holds the rake in position, while at the same time, should it suddenly strike any obstruction upon the ground, the springs g allow it to yield bodily; but should the rake come in contact with any obstruction near either end that end can be conveniently raised so as to ride over the obstruction without disturbing the other end of the rake by simply pressing down with the foot the treadle J on the side you wish the rake elevated.

I am aware horse-rakes have been made so that the rake could be elevated by levers to clear obstructions lying upon the ground. Such I do not claim as my invention.

It is obvious that the arrangement of parts may be varied so as to produce the same results—as, for instance, the spring may be put upon the arm and the catch fastened upon a stationary plate attached to the frame. Such devices, however, I consider as an equivalent mode of arriving at the same result.

The particular improvements which constitute my said invention, and which I claim as having been originally and first invented by me, are—

1. The arrangement of the treadles J J, hung to the frame, in combination with the rake-bar and yoke for raising one end of the rake without disturbing the other, substantially as set forth.

2. The combination of the springs g with the arm E and catch-plate I, for holding the rake-bar in position and at the same time to allow it to yield bodily to any obstruction there may be upon the ground, substantially as set forth.

ISAIAH C. BURGET.

Witnesses:
   PHILANDER SMITH,
   JAMES EVANS.